No. 764,358. PATENTED JULY 5, 1904.
A. H. HOAG & J. B. SALO.
WEIGHING MECHANISM FOR REFRIGERATORS.
APPLICATION FILED AUG. 13, 1903.
NO MODEL.

WITNESSES:

INVENTORS
Andrew H. Hoag
John B. Salo
BY
ATTORNEYS

No. 764,358. Patented July 5, 1904.

UNITED STATES PATENT OFFICE.

ANDREW H. HOAG AND JOHN B. SALO, OF NEW YORK, N. Y.

WEIGHING MECHANISM FOR REFRIGERATORS.

SPECIFICATION forming part of Letters Patent No. 764,358, dated July 5, 1904.

Application filed August 13, 1903. Serial No. 169,363. (No model.)

*To all whom it may concern:*

Be it known that we, ANDREW H. HOAG and JOHN B. SALO, both citizens of the United States, and residents of the city of New York, borough of Manhattan, in the county and State of New York, have invented a new and Improved Weighing Mechanism for Refrigerators, of which the following is a full, clear, and exact description.

Our invention relates to a weighing mechanism for refrigerators; and one object that we have in view is to provide means for use in an ice-chamber whereby the weight of a cake of ice or any shortage in the weight may be ascertained when it is deposited in the ice-chamber.

A further object of the invention is to provide an improved form of weighing mechanism which is adapted to be withdrawn readily from the ice-chamber when it is desired to wash or clean the latter, and, furthermore, to produce a simple and efficient construction which may be used on refrigerators of different classes and which can be manufactured for sale at a low cost.

Further objects and advantages of the invention will appear in the course of the subjoined description, and the actual scope thereof will be defined by the annexed claims.

Reference is to be had to the accompanying drawings, forming a part of this specification, in which similar characters of reference indicate corresponding parts in all the figures.

Figure 1:
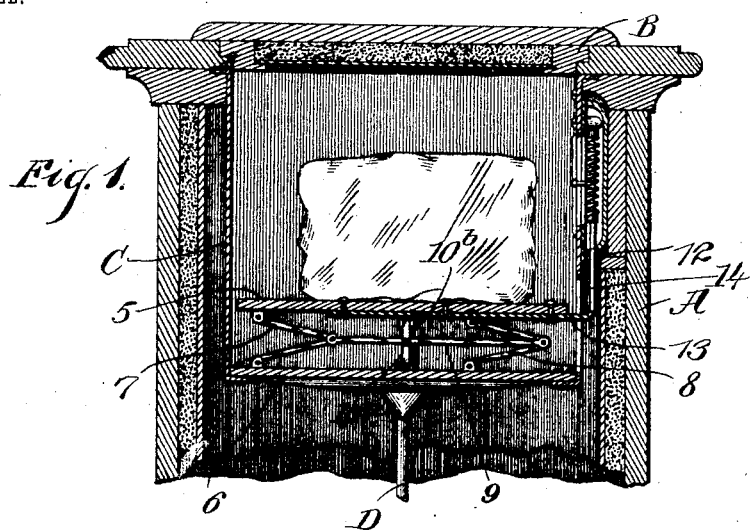
Figure 2:
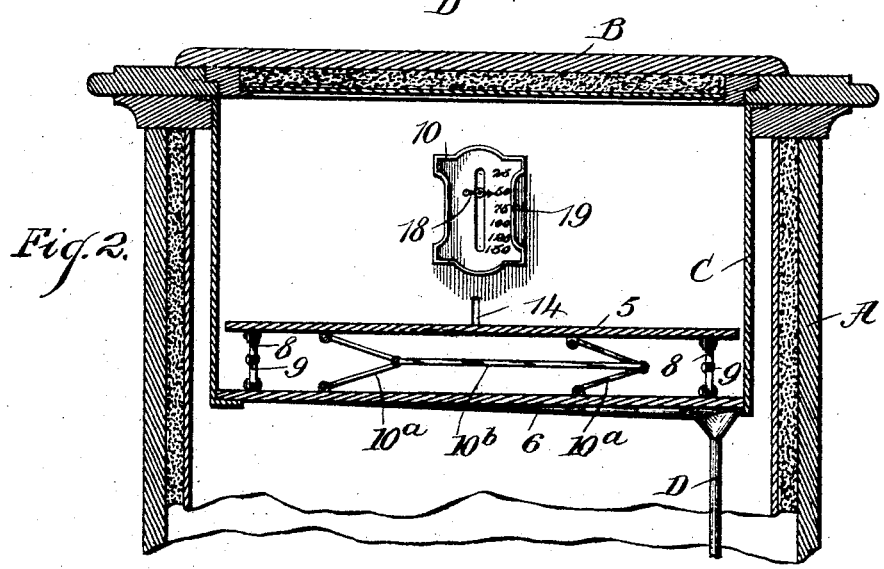
Figure 3:
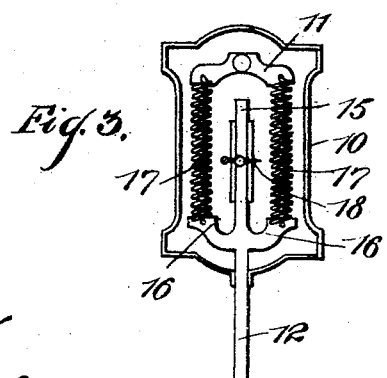

Figure 1 is a vertical sectional elevation through a portion of a refrigerator, showing our improved weighing mechanism applied to the ice-chamber thereof. Fig. 2 is a sectional elevation in a direction at right angles to Fig. 1, and Fig. 3 is a detail fragmentary view of a portion of the spring-balance.

In order that others skilled in the art may understand our invention, we have shown it applied to a refrigerator A of that class wherein the top B is adapted to be opened for the introduction of ice into a tank or container C; but it will be understood that we do not desire to limit our invention to use in connection with a refrigerator of this special type, because the weighing mechanism may be applied to any kind of refrigerator or ice-chest wherein it is desired to ascertain the weight of the ice when it is deposited or placed in an ice-chamber. The tank C is shown as being suspended from the upper permanent part of the refrigerator A, and the bottom of this tank is arranged to discharge drip-water to a drain-pipe D.

Our invention contemplates the employment of a movable bottom 5, which is adapted to be supported on a base 6, the latter resting on the bottom of the ice-tank C. This base-plate is removable at will from the ice-tank, and it is shown as consisting of a plate or board which extends practically the full length and width of the ice-tank, although this special form of the base is not material. The movable bottom of the scale mechanism is mounted on the base in a way to have movement toward and from the same and to be sustained in a horizontal position. Any suitable devices may be employed to sustain the movable bottom, but, as shown by the drawings, we contemplate the use of toggles 7 8, the links of each toggle being connected pivotally to the base and the movable bottom, respectively, and said links being pivoted to an equalizer bar or rod 9. As shown by Fig. 2, a plurality of toggles are employed to sustain the movable bottom in the desired horizontal position, and the toggles of each pair are operatively connected by the equalizer-bars, two of said toggles being located at the sides of the movable bottom and the base. An additional set of toggles $10^a$ is located at the middle of the movable bottom and connected by an equalizer-bar $10^b$, the pivots of said central toggles being at right angles to the pivots of the side toggles. The described construction of the toggle mechanism allows the movable bottom 5 to move vertically with relation to the base and within the chamber of the ice-tank; but this bottom is prevented from tilting sidewise or endwise by the toggle mechanism arranged and connected in the manner shown and described. With the movable bottom is associated a spring-balance, which is adapted to maintain the said bottom and the toggle mechanism normally in their operative positions; but when the load is placed on the movable bottom the toggles will give and the spring-balance is distended in a way to indicate the weight of the load. The spring-balance is shown by the drawings in the form of a casing 10, adapted to be fastened to the outside of the ice-tank C, said casing being provided with a stationary bridge 11, which is fastened inside of the casing by suitable means. The lower part of the casing is provided with an opening which allows the free playof a rod 12, the latter having an inwardly-extending arm 13, which passes through a slot 14 in the ice-tank and fits below the movable bottom 5. The bottom thus rests directly upon the arm of the rod 12, and, if desired, this arm may be secured to the bottom in a removable way—as, for example, by screws; but we prefer to allow the bottom to rest directly upon the arm in order that the bottom, the toggle mechanism, and the base may be withdrawn bodily from the ice-tank when it is desired to clean the latter. The rod 12 is provided with an extended shank 15 and with laterally-branching members 16, the latter being disposed immediately below the bridge 11. The springs 17 of the balance are attached to the branches 16 of the rod 12 and to the bridge 11, and when the rod 12 is pulled downward by the imposition of weight on the bottom 5 these springs are distended. The shank 15 of the rod 12 is provided with an index or pointer 18, which is arranged to traverse a scale 19, which is placed inside of the ice-tank in a position where it may be readily observed, and said tank is provided with a slot for the free play of a pin which attaches the pointer to the stem 15 of the platen-rod 12.

From the foregoing description it will be seen that the movable bottom is raised by the energy of the spring 17, so that the pointer will indicate zero on the scale; but when a cake of ice is placed on the bottom the latter is forced downwardly, so as to pull on the rod 12, distend the springs, and make the pointer indicate the weight of the ice. The movable bottom is kept in a horizontal position at all times by the toggle mechanism, so that the ice may be placed at any point on the bottom without changing its position and affecting the accuracy of the scale mechanism.

Having thus described our invention, we claim as new and desire to secure by Letters Patent—

1. The combination with an ice-chamber having an internal ledge, of a base resting on said ledge within the ice-chamber and removable therefrom, a vertically-movable bottom, means connecting said bottom with the base for holding the bottom parallel with the base and making the bottom removable with the base from the ice-chamber, and a spring-balance having a spring-lifted rod which is connected detachably to the bottom.

2. The combination with an ice-chamber, of a vertically-movable bottom, means for maintaining the bottom normally in a horizontal position in said chamber, a spring-lifted rod provided with an arm which is fitted to the bottom and is effective in holding the same normally in a raised position, and means for detachably connecting the arm to said bottom.

3. The combination with a base, of a bottom movable with relation to the base, equalizer-bars extending in different directions relatively to each other, means connecting said bars with the base and the bottom for holding the latter normally in a position parallel to the base, and a spring-balance coöperating with said bottom.

4. The combination with a movable bottom, of a plurality of toggles connected to said bottom, the axes of certain toggles being at an angle to other toggles, equalizer-bars associated with said toggles, and a scale mechanism controllable by the bottom.

5. The combination with a base, and a movable bottom, of a plurality of toggle connections between the base and the bottom, certain of said toggles being movable on axes lying at right angles to the axes of other toggles, and a scale indicating mechanism controllable by the bottom.

6. A weighing mechanism for refrigerators, comprising a base, a bottom movable vertically with relation to said base, a plurality of toggle connections between the base and the bottom, the axes of certain toggle connections being at right angles to other toggle connections, equalizer-bars pivoted to said toggle connections, and a spring-balance operatively related to the bottom.

In testimony whereof we have signed our names to this specification in the presence of two subscribing witnesses.

ANDREW H. HOAG.
JOHN B. SALO.

Witnesses:
Jno. M. Ritter,
H. F. Bernhard.